Feb. 17, 1970 J. L. WHEELER ET AL 3,496,536
DATA LINK TEST APPARATUS
Filed May 2, 1966 3 Sheets-Sheet 1
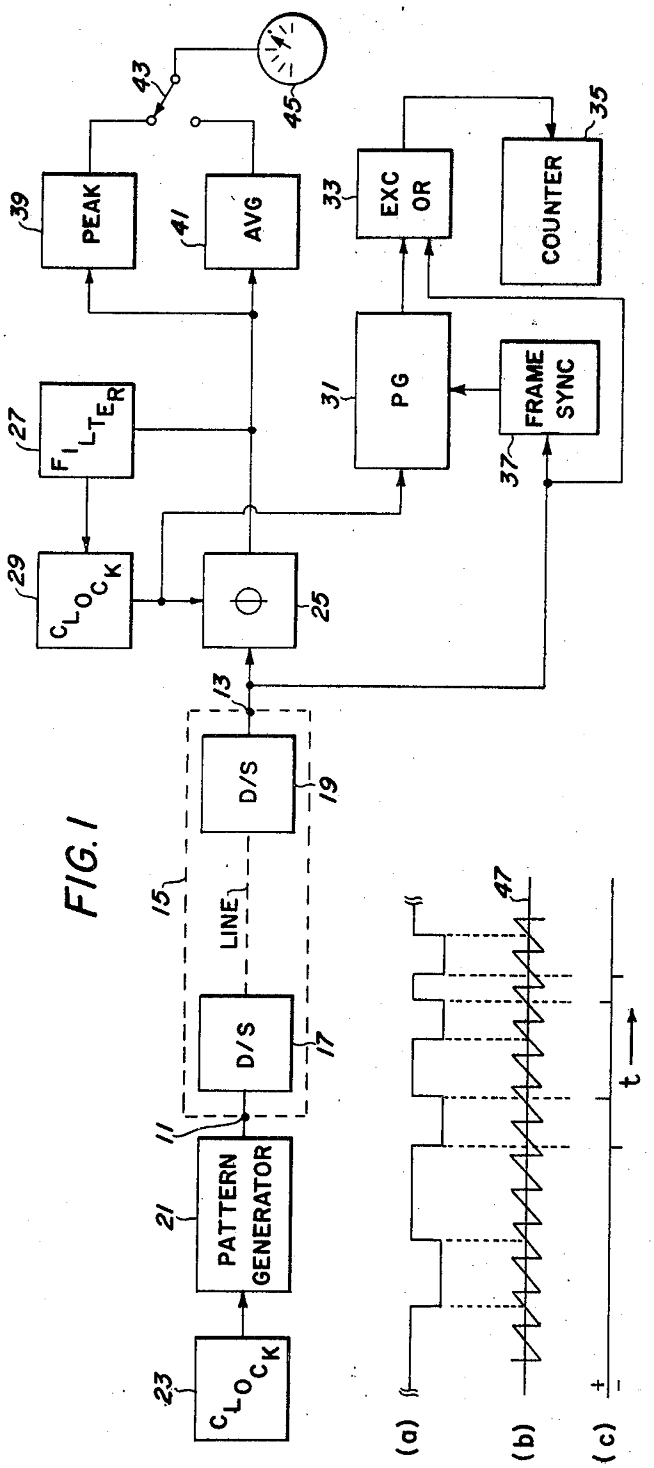
FIG. 1
FIG. 2
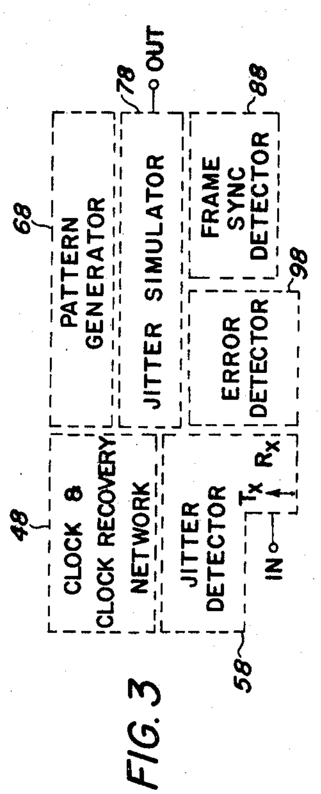
FIG. 3
INVENTORS.
STEPHEN E. TOWNSEND
JOHN L. WHEELER
BY
ATTORNEYS Feb. 17, 1970 J. L. WHEELER ET AL 3,496,536

DATA LINK TEST APPARATUS

Filed May 2, 1966 3 Sheets-Sheet 2

INVENTORS.
STEPHEN E. TOWNSEND
JOHN L. WHEELER

BY Anthony D. Cennamo
Paul W. Fish
ATTORNEYS

DATA LINK TEST APPARATUS

Filed May 2, 1966

INVENTORS.
STEPHEN E. TOWNSEND
JOHN L. WHEELER
BY Anthony P. [signature]
Paul W. Fish
ATTORNEYS United States Patent Office 3,496,536
Patented Feb. 17, 1970

3,496,536

DATA LINK TEST APPARATUS

John L. Wheeler, West Webster, and Stephen E. Townsend, Rochester, N.Y., assignors to Xerox Corporation, Rochester, N.Y., a corporation of New York Filed May 2, 1966, Ser. No. 546,982
Int. Cl. H04l 7/02, 1/10
U.S. Cl. 340—146.1 10 Claims

ABSTRACT OF THE DISCLOSURE

Data transmission link test apparatus wherein a predetermined binary data test pattern is coupled to the transmitting end of a non-synchronous transmission system. At the receiving terminal the data stream is coupled to a phase lock loop wherein a highly stable local receiver clock is phase locked with the transmitter clock. Each transition of the received data stream is compared on a time basis with a stable standard to generate suitable error or distortion signals. The error signals thus generated are coupled to a compensating network for slaving and hard or stable receiving clock with the transmitter clock. The error signals are also coupled to suitable meter circuits for measuring peak to peak and average jitter thus indicating a margin of error of the transmission system.

This invention relates to electrical measuring and testing apparatus and more particularly to apparatus for determining performance parameters of data transmission systems.

With the advent of computers, data processing machines and graphic communication systems, there has been a growing need for the transmission of increasingly large volumes of data. In most instances it is desirable from several points of view to utilize existing communication facilities. The use of existing communication facilities where available provides a ready made communication path thus avoiding the cost of initially establishing and of maintaining a communication facility. Thus, for those applications in which the user does not possess a right of way on which a private communication link could be built and particularly for those applications in which the volume of data to be handled does not justify the initial investment required for installing an appropriate communication link, it is desirable to rent existing communication facilities from public carrier utilities.

While the use of existing communication facilities on a rental basis is desirable in most data transmission applications it is not without attendant difficulties. The use of existing transmission facilities on a rental basis obviously implies that the communication facilities were not specifically designed to meet the signal limitations or requirements of particular communication apparatus and thus may be subject to errors from, for example, crosstalk, carrier shifts and/or errors due to signal quantizing by the carrier. The final criteria and the performance of a communication system is how well the final receiving device is able to reproduce the transmitted message. Transmission errors which are ultimately reproduced as errors in their reconstituted transmitted information at the receiver may be determined by comparison of the sent and received messages. Most of the time a useful communication system operates below a threshold of error. Thus, a measurement of errors often gives no information as to how much margin there is against a wrong decision at the receiving apparatus which would give rise to the reproduction of an error.

Thus while it would be possible, for example, in the graphic communication system to physically connect a transmitting and receiving apparatus over an existing communication facility to determine the compatibility of the communication link with the communication apparatus requirements, this would involve several undesirable features. For example, it would not be convenient for a salesman to have to couple the actual transmitting and receiving apparatus to existing facilities to determine their compatibility with system requirements. Major disadvantages in such a direct solution would involve the effort of transporting and installing commercial apparatus as well as the undesirable shock and vibration which the apparatus would inevitably be subjected to. Further such a method of testing existing facilities would be undesirable because the number of errors detected on the comparison basis, i.e., the error rate, would be a function of the particular apparatus employed and its alignment or tuning state. For these illustrative reasons, while it is desirable to determine the signal distortion of the communication facilities being considered for a particular systems application, it is undesirable to employ the actual apparatus for determining such signal distortion on a simple error comparison basis.

Accordingly it is an object of the present invention to provide portable apparatus for measuring data signal distortion over data transmission facilities.

It is a further object of the present invention to facilitate the determination of compatibility of communication systems with predetermined apparatus specifications.

It is a further object of the present invention to simplify the quantitative evaluation of signal distortion over a data transmission channel.

It is yet a further object of the present invention to provide a simplified, one-way transmission link test apparatus.

In accomplishing the above and other desirable objects, applicant has invented an improved data transmission link test apparatus. In an illustrative embodiment of applicant's data transmission link test apparatus, a predetermined binary data test pattern is coupled to the transmitting end of a non-synchronous transmission system. at the receiving terminal the data stream is coupled to a phase lock loop wherein a highly stable local receiver clock is phase locked with the transmitter clock. Each transition of the received data stream is compared on a time basis with a stable standard to generate suitable error or distortion signals. The error signals thus generated are coupled to a compensating network for slaving the hard or stable receiving clock with the transmitter clock. The error signals are also coupled to suitable meter circuits for measuring peak to peak and average jitter thus indicating a margin of error of the transmission system. The corrected clock may be utilized to drive a pattern generator for generating a binary data pattern identical to that coupled to the sending terminal of the transmission link. The respective like binary data patterns may then be compared and a number of bit by bit errors or non-coincidences therebetween may be determined as an indication of the error rate of the transmission system.

For a more complete understanding of applicant's invention and other objects and aspects thereof reference may be had to the following detailed description in conjunction with the drawings in which:

FIG. 1 is a block diagram of a simplified data link test apparatus in accordance with the principles of the present invention.

FIG. 2 is a series of voltage-time waveforms useful in understanding the operation of the data link test apparatus in accordance with the principles of the present invention.

FIG. 3 is a layout showing the arrangement of various sub-assemblies comprising the preferred embodiment of applicant's data link test transceiver illustrated in FIG. 4.

Figure 4:
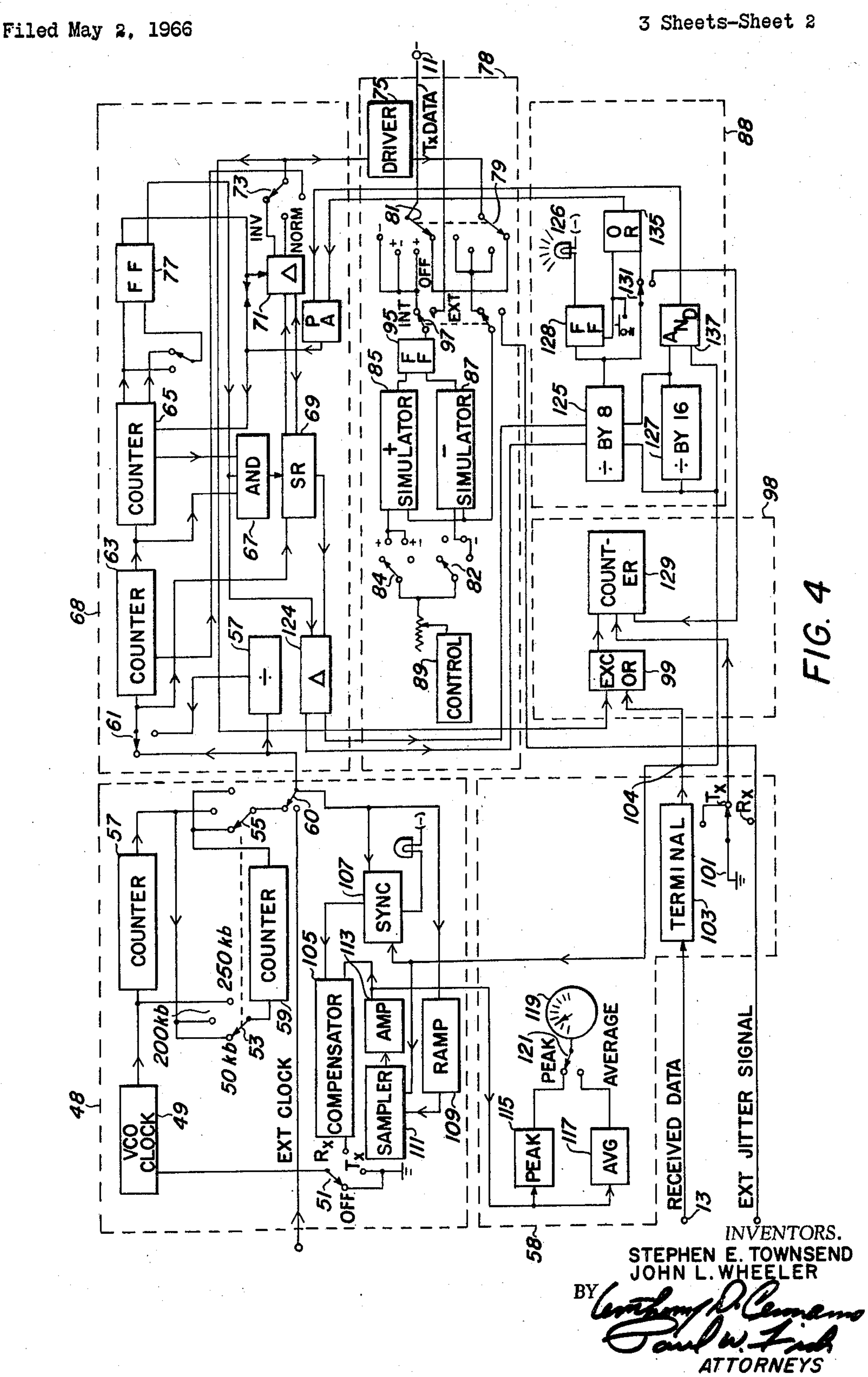
FIG. 4 is a block diagram of a transceiver data link test apparatus in accordance with the principles of the present invention.

Referring now to FIG. 1 there is shown a block diagram of a simplified data link test apparatus in accordance with the principles of the present invention. As shown the communication system to be tested comprises an input terminal 11, an output terminal 13 and a communication link 15 interconnecting the respective transmission line terminals. Additionally the communication link may comprise data sets 17 and 19 at the respective input and output terminals for appropriately modifying the form or frequency domain of the input signals to that appropriate for transmission over the channel. As is common in communication systems, the form of the information signals applied to the input terminal 11 is regenerated and supplied to the output terminal 13 thereof.

In general the detection of data signal distortion in accordance with the principles of the present invention involves the measurement of time displacement of the signal transitions in the received pattern from their normal undistorted positions. As is known the time distortion of signal elements can be classified as systematic or fortuitous. The systematic component is commonly referred to the average distortion which occurs when a particular waveform is repeatedly transmitted through a system. The fortuitous component is commonly defined as the variation from the average. The sum of such systematic and fortuitous components makes up the total distortion produced during the transmission of data from an input terminal to the output terminal.

As shown a pattern generator 21 under the control of clock 23 couples a train of random synchronous data signals to the input terminal 11 of a communication link 15. In determining the distortion of binary signals a time comparison between the transitions of a transmitted and received signals is necessary. Thus, the signals emanating from receiver terminal 13 are coupled to a phase lock loop including phase shifter 25, filter 27 and receiver clock 29.

As will hereinafter be more fully described in the phase lock loop the frequency of the stable receiver clock 29 is modified or corrected in accordance with an error signal applied from filter 27 to clock 29. In this manner the receiver clock is locked or slaved to the transmitter clock thereby permitting a bit by bit comparison between the transitions of the transmitted and received signals. The corrected clock is then applied to pattern generator 31 in which a test signal pattern identical to that generated by the pattern generator 21 at the transmitting terminal is generated. By comparing the output of the receiver pattern generator 31 bit by bit with the data stream emanating from the receiver terminal 13 in an exclusive OR circuit 33 the error count during a predetermined period may be complied, for example, by driving a counter 35 from the output of the exclusive OR circuit 33. Suitable frame sync detector circuit means 37 is employed to insure frame synchronization between the transmitting and received pattern.

As hereinbefore stated, the determination of the data signal distortion involves the measurement of time displacement of the received signal transitions from their normal undistorted position. The phase locked, i.e., bit synchronized, output of clock 29 provides a suitable time base for comparison of the transistors of the received signals relative to their normal undistored position. As shown in FIG. 1 the output of the phase shifter 25 is coupled to the input of peak to peak meter circuit 39 and average meter circuit 41. The output of the respective meter circuits 39 and 41 may be selectively coupled via switch 43 to the input of an appropriate meter 45.

Referring now to FIG. 2, the measurement of the data signal distortion of the received data stream will now be explained. FIG. 2*b* shows a sawtooth time base suitable for use with a random synchronous data pattern transmitted over non-synchronous lines. As shown the ramp portion of the sawtooth waveform periodically passes through a reference level 47 in the center of its amplitude range at the nominal transition time. A portion of a typical random synchronous data signal as might be emanating from receiver terminal 13 of communication link 15 is illustrated in FIG. 2*a*. The sampling of the timing ramp waveform at the signal transition times of the received pattern results in pulses illustrated in FIG. 2*c* which have an amplitude proportional to the time distortion. As will hereinafter be more fully explained, these levels may be stored on a capacitor as an error signal. As shown the time base waveform has a value below the reference value for early transitions and a value above the reference transitions for late transitions, and thus as shown in FIG. 2*c* the error signals generated at the respective transitions of the received waveform may be characterized as plus or minus with reference to the reference level for early and late transitions respectively.

As illustrated in FIG. 1 such error signals or amplitude samples may be integrated and used to form an error signal for controlling the pase of the basic timing waveform from clock 29 thereby keeping the average distortion near zero. Further such error signal may be applied to appropriate meter circuits for appropriate display on a meter. In many cases a measure of peak distortion without regard to sign is sufficient. In such case the error signals may be applied to a rectifier followed by peak reading circuit. Any appropriate peak to peak and average meter reading circuits may be used in accordance with the present invention.

Referring now to FIG. 3 there is shown a layout diagram of a data link test transceiver in accordance with the present invention. For convenience similar sub-assemblies of the transceiver are appropriately designated and similarly numbered in the layout illustrated in FIG. 3 and the block diagram illustrated in FIG. 4.

Referring now to FIG. 4 there is shown a block diagram of the preferred embodiment of a data link test transceiver apparatus embodying the principles of the present invention. For convenience the respective transmitting and receiving mode will be described separately. As would be evident to those skilled in the art, in testing a communication link a similar transceiver would be coupled to the respective transmitting and receiving terminals of a transmission link similar to that shown in FIG. 1 with one of the units being designated as the transmitter the other as the receiver. In the preferred embodiment the data link test apparatus operates in a one way transmission test, however, as would be evident to those skilled in the art it would be possible to loop back the transmission channel so as to have the transmitter and receiver adjacently located.

TRANSMITTING MODE

As hereinbefore stated the measurement of data signal or distortion involves the measurement of the time displacement of the received signal transitions relative to their normal undisturbed portions. In the transmitting mode a source of timing pulses is generated by clock 49 which may comprise, for example, a one megahertz crystal oscillator. The output of the crystal oscillator which preferably includes a voltage controlled phase-lock loop is stabilized in the transmit mode with the switch 51 coupling a source of reference potential, for example, ground to the VCO input. The output of the clock is selectively divided to determine the bit rate by the positioning of the switches 53 and 55 which, for example, may be used to divide the basic crystal frequency into 50 kilobit, 200 kilobit and 250 kilobit rates by selectively connecting counters 57 and 59 in a cascade or independnt relationship with the output of the clock 49. With the switches 53 and 55 appropriately positioned to select the desired bit rate, the clock pulses are coupled via switches 60 and 61 to the input of pseudo random pattern generator 68.

The binary data test pattern to be coupled to the line under test is generated in pseudo random pattern generator 68. As shown in the clock pulses emanating from the transmitter clock are coupled via switch 61 to divider counter 63 which in turn drives a similar counter 65. Counters 63 and 65 may, for example, comprise a divide by eight and a divide by 256 counter, respectively, for generating appropriate signals from the clock frequency. As shown, an output of counter 63 and a output from counter 65 are coupled via AND gate 67 to register 69. Pulses emanating from the AND gate 67 are shifted into register 69 under the control of shift pulses which correspond to the clock frequency. In this manner a pseudo random sequence of binary ones and zeroes is generated at the output of register 69 in response to the succesive sequence of the binary counts registered in the respective counters 63 and 65. As is known in the art a pattern length for a code generator may be expressed as $2^n \times n$ bits where $n$ is a number of bistable stages in the code generator register and $n$ bits are sequentially shifted in parallel from the register for serial transmission at a sub interval of the clock. Successive information blocks are shifted from register 69 through buffer store register 71 and via switch 73 to line driver 75. Suitable reset pulses may be generated in flip-flop 77 for controlling the initial periodic reset of counters 65, 69 and buffer 71.

As is known in the art the feedback controls associated with the various counters 65, 69, and 71 may be selected to generate any desired information pattern. In addition the reset lines in conjunction with, for example, flip-flop 77 may be utilized to generate a periodically occurring frame sync signal corresponding to predetermined counts in the respective counters.

The binary signal test pattern emanating from line driver 75 is coupled, with switches 79 and 81 in the position shown, directly to the input terminal of the communication link under test. By selectively positioning switches 79, 81, 82 and 84 in either the "positive," "negative," or "both" positions simulated jitter or signal distortion may be generated in jitter simulator 78 to selectively distort the signals prior to the coupling thereof to the transmission line.

For example, with the switches 79, 81 and 84 in the "positive" position, the bits of test pattern data stream emanating from line driver 75 are coupled to one input of the positive and negative jitter simulator circuits 85 and 87. Jitter control 89 which may comprise a source of variable reference potential is selectively coupled via switches 82 and 84 to the respective input terminals of the positive and negative jitter simulator circuits 85 and 87. The respective jitter simulator circuits 85 and 87 may comprise Schmidt trigger type circuits wherein the leading or trailing edge of the data waveform are delayed an amount proportional to the control potential selected by the jitter simulator 89 before an output pulse would be generated by the jitter simulator circuits. The outputs of the respective jitter simulator circuits are coupled to the triggering inputs of flip-flop 95 with the output of flip-flop 95 coupled via switch 97 to the input terminal of the transmission line. In this manner either the leading or trailing edge or both of the data test stream generated by the pseudo random pulse generator 68 may be selectively altered prior to the transmission thereof. In this manner the operation of the transceiver at the receiving end may be calibrated and checked. While the output of the code register 69 of the pseudo random pulse generator is coupled from the switch 73 to the error detector circuit 98 it will be noted that the switch 101 in the transmit position holds one input of the error rate counter 129 at a reference potential. Thus reference potential selectively disables the error gate when the transceiver is in the transmitting mode.

RECEIVING MODE

At the receiving station the evaluation of the performance of the data transmission system under test involves a time comparison between the transitions of the transmitted and received signals. The received data stream is coupled from the communication line to a line terminal 103. At the line terminal the signal level is shifted to an appropriate level compatible with the signal levels of the transceiver logic. The received signal wavetrain is coupled in parallel from junction 104 to the clock and clock recovery network 48, to the error detecting network 98 and to the frame sync detector 88. In addition the error signals generated in the clock recovery network 48 are coupled to the jitter detector circuit 58. While in operation the several tests are concurrently conducted, the various tests will be described separately, for convenience of explanation.

In the receiving mode, switch 51 couples the output of compensating network 105 to the input of the voltage controlled oscillator 49. With switches 53 and 55 in the appropriate position to select the desired bit rate, as hereinbefore described in conjunction with the transmitting mode, the output of clock 49 is coupled via switch 60 to the bit sync detector 107 comprises the received data test stream from junction 104. The bit sync detector 107 which may comprise appropriate logical gating means for developing appropriate signals for indicating mis-synchronous, non-coincident, conditions between the received pulses and the locally generated pulses from clock 49. The output of the bit sync detector 107, which as hereinafter will be more fully explained in conjunction with FIG. 5, is employed to modify an automatic phase lock control loop of the compensating network 105 and to widen the sync capture during initial lock-on.

Figure 5:
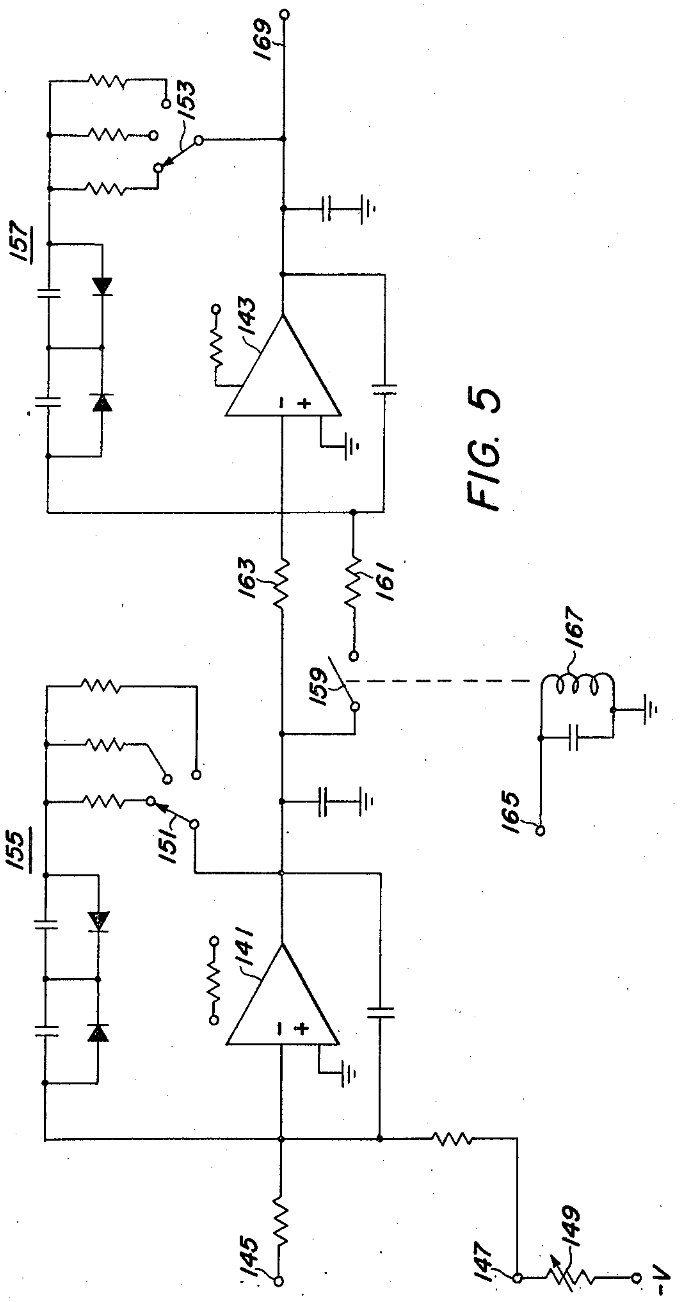
FIG. 5 is a schematic diagram of a compensating network utilizable in the clock portion of the transceiver illustrated in FIG. 4.

The compensating network 105 as will be more fully explained in conjunction with FIG. 5 comprises a pair of cascaded amplifiers. The amplifiers input and feedback networks are switchable to provide the proper servo-loop characteristics for the automatic phase lock whereby a DC level is generated proportional to the frequency difference detected between the received data stream and the locally generated timing pulses from clock 49. As shown the output of the compensating network 105 is coupled to the input of a voltage control oscillator terminal of clock 49 by switch 51 when it is in the receiver position. Thus in response to error signals which are generated in a manner hereinafter to be more fully described the receiver clock 49 will be slaved with the transmitter clock during phasing operations.

As hereinabove described in conjunction with FIG. 2, the measurement of the signal distortion is made by comparing the received signal transitions with a suitable periodic time base. This comparison in the receiving mode is made by coupling the received data stream and the output of ramp generator 109 to the input of sampling circuit 111. The ramp generator may comprise any ramp generator known in the art.

In operation the ramp generator 109 is periodically reset by clock signals from clock source 49 coupled to the input of ramp generator 109 by switch 60. Thus with the ramp and received signal train applied to the sampling circuit 111, which for example may comprise the four diode bridge gate, the ramp is sampled proximate, for example, a reference midslope point by the transitions of the received data stream. The ramp voltage at the sampled time is stored on a holding capacitor and coupled via buffer amplifier 113 to the input of compensating network 105. As shown in FIG. 2*c* the error signals are proportional to the distortion or deviation from the normal position of the transitions of the waveform pattern and as such constitute a measure of the missynchronization between the received transmitted clock pulses during initial lock-on and thereafter a measure of the signal degradation caused by the communication channel. As shown the output from buffer amplifier 113 is coupled as one input to the compensating network 105 and to the input of the peak to peak meter circuit 115 and the average meter circuit 117.

Coupling the error signal generated by the sampler circuit 111 to the meter 119 via switch 121 provides a simple means for obtaining a meter indication of signal degradation or distortion. As is known the meter deflection could be calibrated to be proportional to the degradation present in the received signal train. Further the meter scales could be calibrated to indicate signal distortion as a percent of the unit signal duration. Peak to peak signal distortion readings may be obtained by AC coupling the output of buffer amplifier 113 to a phase splitter circuit. For peak to peak readings two substantially identical signal channels could be employed. One signal channel would be employed to derive a voltage proportional to the most positive peaks in the error signals while the other channel would generate a voltage proportional to the most negative peaks. The output signal proportional to such positive and negative peaks could then be stored, for example, as signal levels on separate capacitors and then the respective signals summed to generate a peak to peak error signal. For obtaining average signal distortion readings, the output from the phase splitter could be coupled to a full wave rectifier and subsequently filtered with the filter time constant representing the desired intervals. The output of the filter could then be coupled via switch 121 to the meter 119.

In addition to the jitter measurements and clock recovery operations set forth, above, an error count is also run on the received test pattern. The received test pattern is coupled from junction 104 as one input to exclusive OR gate 99. The other input to exclusive OR gate 99 is derived from the pseudo random pattern generator 68. With switch 51 in the receiver mode position, the clock signals from voltage control oscillator 49 are slaved during the initial capture time to the transmitter clock. Thus the signals coupled to the pseudo random code generator 68 are in bit synchronism with the transmitter clock and and thus derives a similar binary pattern to that generated at the transmitter.

With the bit and frame sync established the output of pseudo random pattern generator 68 at the receiver will be the identical pattern as that at the transmitter. The bit sync as hereinabove described is accomplished by the error signals emanating from the compensating network which is proportional to the frequency difference between the transmitter clock and the receiver clock. Similarly frame sync is established between the patern generated at the transmitting terminal and that at the receiving terminal by the frame sync detector 88 resetting the pattern generator 68 in response to a detection in the frame sync detector of a predetermined frame sync signal. As hereinbefore stated a suitable frame sync signal may comprise a predetermined number of binary zeros in the transmitted test pattern. Counter 125 and 127 of the frame sync detector 88 are arranged to detect such pattern in the received signal and to selectively reset via gates 135 and 137 the pseudo random signal generator 68 at the receiver to establish frame sync. Delay 124 facilitates the comparison of the locally generated and received test pattern waveforms.

With the respective test patterns from the pseudo random code generator at the transmitter and receiver terminals being in bit and frame sync the respective patterns are compared in the exclusive OR gate 99 of the error detector circuit 98. This logical comparison bit by bit determines the occurrence of errors. The signals emanating from the exclusive OR gate 99, which indicate an error or non-coincidence between the received data sequence and the locally generated data sequence, are coupled to a bit error counter 129 which in the normal manner increases its binary count in response to each input pulse applied thereto. As shown the error rate counter 129 may have applied thereto additional control and reset inputs. For example, the input coupled to the error counter 129 from switch 101 would be arranged to maintain the counter inactive in the transmitting mode. Similarly the input coupled to counter 129 from switch 131 may be employed to manually reset the counter during frame synchronization. Frame sync may be indicated by lamp 126 which may be selectively actuated by flip-flop 128.

Referring now to FIG. 5 a compensating network compatible with the block diagram illustrated in FIG. 4 will now be described. As hereinbefore stated the clock 49 which generates the basic timing signals for the test apparatus is preferably a voltage controlled oscillator, for example, having a nominal frequency of one megahertz. In the transmitting mode a reference potential is coupled to the input maintaining the clock at its nominal frequency. In the receiver mode the voltage control input is coupled to the output of the compensating network 105 as was hereinbefore described in conjunction with FIG. 4. The automatic phase control loop of the voltage control oscillator preferably has a wider capture range for facilitating initially establishing bit sync.

For example, the widened capture range may be achieved by selectively increasing the loop gain of the automatic phase during initial lock-on. In the receiving mode the output of the compensating network is coupled to the input terminal of the voltage controlled oscillator. As shown in FIG. 5 the compensating network may comprise a pair of cascaded DC operational amplifiers 141 and 143 which may be of any design well known in the art. The error signal from the sampling network 111, which are proportional as hereinabove described in conjunction with FIG. 2*c* to the time distortion of the transitions of the test pattern, is coupled to terminal 145 of the input operational amplifier 141. An appropriate balancing signal may be coupled to the input of the terminal 147 first operational amplifier 141 by adjusting the potentiometer 149. Switches 151 and 153 provide means for varying the input and feedback networks 155 and 157 of the respective operational amplifiers 141 and 143 to adjust the time constant characteristics to the rate as selected by switches 53 and 55 illustrated in FIG. 4.

In order to widen the bit sync capture range of the automatic phase lock control loop during initial lock-on, switch 159 is provided to selectively connect resistor 161 in parallel with resistor 163 thereby decreasing the time constant of the operational amplifier circuit when the transmitted and locally generated clock pulse patterns are out of synchronism. As hereinabove described in conjunction with the bits sync detector 107 of FIG. 4, it is desirable to employ a shorter RC time constant in the compensating network 105 during bit phasing operations to facilitate phasing or slaving the receiver clock with the transmitter clock. The output of the bit sync detector 107 is applied to terminal 165 to selectively energize relay coil 169 in response to the detection by sync detector 107 of an out-of-sync condition. With the relay coil 167 energize, switch 159 is closed thereby connecting resistor 161 in shunt with resistor 163 thereby lowering the resistance and thus the time constant of the compensating network. When bit sync is established, relay 167 is de-energized thereby opening switch 159 to its normal position, as shown, and thus increasing the time constant of the compensating network 105. The output of the compensating network 105 which comprises a DC signal proportional to the integral of any phase difference and thus the frequency difference detected between the transmitted and locally generated clock times is coupled from output terminal 169 to the input of the VCO clock 49 as shown in FIG. 4.

In the foregoing there has been described novel methods and apparatus for determining the capability and existing communication facilities with predetermined communication apparatus requirements. It will be appreciated by those skilled in the art that the block diagrams and circuitry as previously described hereinabove are for illustrative purposes only. Alternative means familar to those skilled in the art may be employed to accomplish the identical or similar logical function and such alternatives are to be considered within the spirit of the present invention.

What is claimed is:

1. In a communication system, data link test apparatus comprising:

means for receiving a test pattern waveform at the receiving terminal of a communication link under test;

controllable oscillator means for generating a pattern of receiver timing pulses;

detector means for comparing bit synchronization between transitions in said received test pattern waveform and said receiver timing pulses;

sampler means including a ramp generator for comparing said locally generated timing pulses with transitions in said received test pattern waveform;

comparator means responsive to said sampler means and to said detector means for generating error signals for controlling said oscillator means;

means responsive to said detector means for widening a bit synchronization capture range of said oscillator means in response to the detection by said detector means of an out-of-sync condition; and, meter means responsive to said sampler means for displaying measurments of the signal degradation induced in the test pattern during transmission over said communication link.

2. The test apparatus defined in claim 1 wherein said oscillator means comprises a voltage controlled oscillator and wherein said comparator means includes operational amplifier means for generating a voltage proportional to the detected frequency difference between the receiver timing pulses and the bit frequency of the received test pattern waveform.

3. The test apparatus defined in claim 2 wherein means for widening the bit synchronization capture range includes means for varying a time constant of said operational amplifier means.

4. The test apparatus defined in claim 1 additionally including bit rate selection means wherein said bit rate selection means includes:

divider means for dividing the repetition frequency of pulses from said oscillator means, and switching means for selectively determining the effective number of stages in said divider means.

5. The test apparatus defined in claim 1 additionally including error rate measuring means for detecting non-coincidence between bits of said receiver timing pulses and said received test pattern, respectively.

6. A data link test transceiver for qualitatively determining data signal degradation introduced during transmission through a communication channel under test comprising:

controllable oscillator means for generating a pattern of timing pulses;

pulse generator means responsive to said oscillator means for locally generating a pseudo random digitalized test pattern wavetrain;

output means for coupling said test pattern wavetrain to an input terminal of a communication channel under test;

input means for receiving a digitalized test pattern wavetrain from an output terminal of a communication channel under test;

clock recovery means for generating an error signal for establishing bit synchronization between timing pulses from said controllable oscillator means and bit transition time as received in the digital test pattern wavetrain;

frame synchronization means for detecting and establishing frame synchronization between said locally generated test pattern wavetrain and said received test pattern wavetrain;

meter means responsive to said clock recovery means for displaying measurements of data signal degradation; and switch means for selective coupling an input of said controllable oscillator means to a source of reference potential and to the output of said clock recovery means during transmitting and receiving modes, respectively.

7. The data link test transceiver defined in claim 6 additionally including jitter simulator means for selectively introducing predetermined amounts of time distortion into either or both of the transitions of said test pattern emanating from said pulse generator.

8. The data link test transceiver defined in claim 6 additionally including error rate measuring means for detecting non-coincidence between bits of said locally generated receiver test pattern wavetrain and said received test pattern wavetrain, respectively.

9. The data link test transceiver defined in claim 6 additionally including bit rate selection means wherein said bit rate selection means comprises:

divider means for dividing the repetition frequency of said oscillator means; and, switch means for selectively determining the magnitude of the division of said repetition of frequency of pulses from said oscillator means.

10. The method of determining digital data signal degradation during transmission over a communication channel comprising the steps of:

generating a pattern of digitalized pseudo random test signals;

coupling said pattern of digitalized pseudo random test signals to the input of a transmission channel under test;

receiving said transmitted test pattern;

widening the synchronization capture range of a receiver timing pulse generator to establish bit synchronization with a receiver clock;

generating a local timing pulse pattern;

detecting bit transition times of the received test pattern;

detecting bit synchronization between said local timing pulse pattern and bit transition times of the received test pattern;

narrowing the bit synchronization capture range of the receiver clock in response to the detection of bit synchronization;

generating a predetermined standard time pattern in response to said local timing pulse pattern; and measuring the time deviation of each transition in the receiving digitalized test pattern with respect to said predetermined time standard.

References Cited

UNITED STATES PATENTS

| | | | |
|---|---|---|---|
| 3,142,802 | 7/1964 | Maure | 340—172.5 X |
| 3,040,983 | 6/1962 | Bigelow | 235—150.3 |
| 3,122,704 | 2/1964 | Jones | 325—363 |
| 3,182,127 | 5/1965 | Wiese | 340—146.1 X |
| 3,341,779 | 9/1967 | Kedson | 340—146.1 X |
| 3,386,081 | 5/1968 | Varsos | 340—146.1 X |

MALCOLM A. MORRISON, Primary Examiner

R. STEPHEN DILDINE, Jr., Primary Examiner

U.S. Cl. X.R.

235—150.3; 325—323